Nov. 10, 1964          A. LESSARD          3,156,497
AUTOMOBILE WINDSHIELD RAIN VISOR
Filed Sept. 10, 1962                         2 Sheets-Sheet 1

INVENTOR.
Acide Lessard
BY
Salter + Michaelson
Attorneys.

Nov. 10, 1964         A. LESSARD         3,156,497
AUTOMOBILE WINDSHIELD RAIN VISOR
Filed Sept. 10, 1962                2 Sheets-Sheet 2
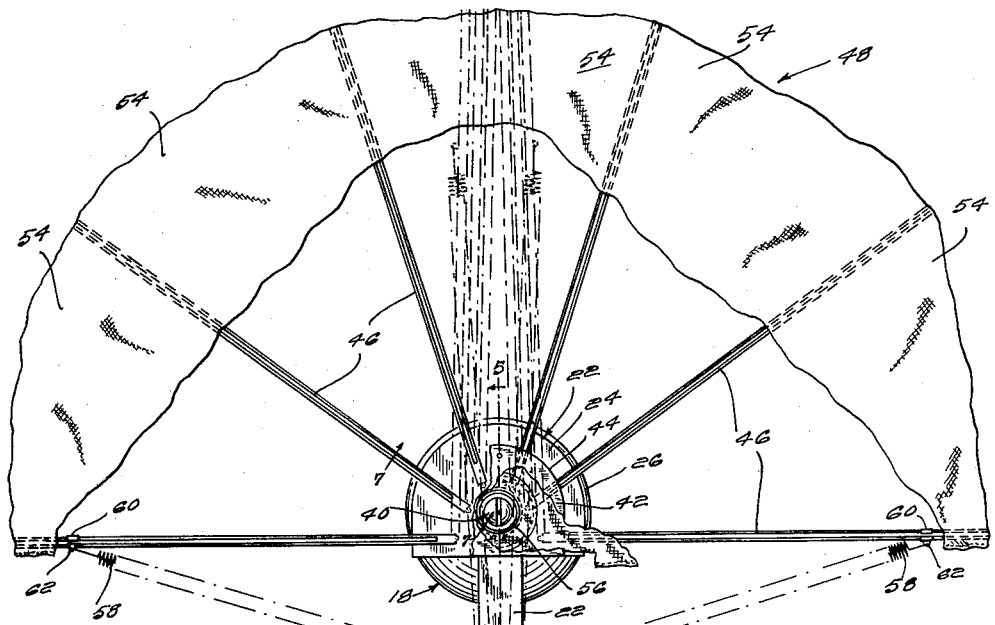
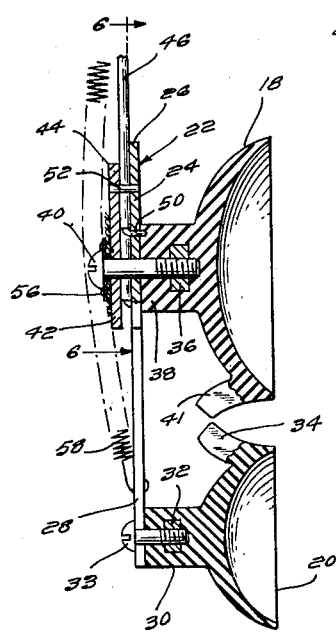
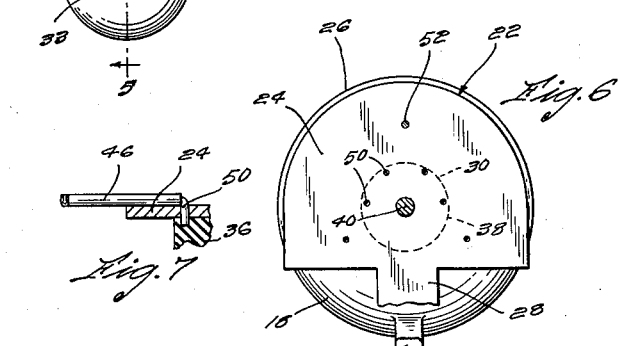
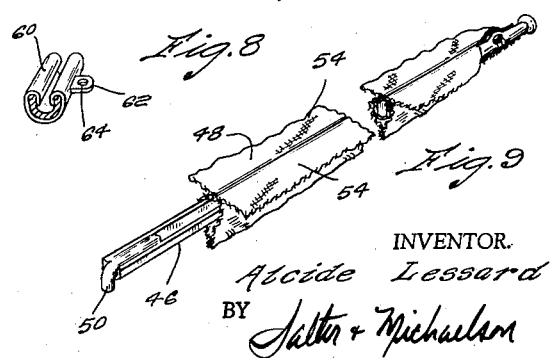
INVENTOR.
Alcide Lessard
BY Salter & Michaelson
Attorneys.

United States Patent Office 3,156,497
Patented Nov. 10, 1964

3,156,497
AUTOMOBILE WINDSHIELD RAIN VISOR
Alcide Lessard, 545 Scituate Ave., Cranston, R.I.
Filed Sept. 10, 1962, Ser. No. 222,338
8 Claims. (Cl. 296—95)

The present invention relates to an automobile rain visor. More particularly, the present invention relates to an automobile rain visor for use in the protection of the windshield of the automobile against rain and has particular application in drive-in theaters.

In recent years, drive-in theaters have become extremely popular and in many locales are operated in both the winter and summer seasons. One of the problems encountered by the public at drive-in theaters is the uncertainty of weather conditions. This has presented a particular problem when a rainstorm occurs after the program has started and most of the patrons are already in the theater. Prior to the instant invention, the appearance of rain during the showing of the movie at the drive-in theater either resulted in the patron using his windshield wiper, viewing the movie screen as best he could through the obscured windshield, or leaving the theater. Normally patrons are reluctant to leave the theater once they have paid admission. Therefore, it has been the custom for drive-in patrons to suffer some inconvenience in viewing the movies at a drive-in theater during a rainstorm. Some efforts have been made heretofore to provide rain visors for automobiles for use in connection with viewing motion pictures at drive-in theaters. However, these prior known rain visors have not been found to be acceptable since they were difficult to install by the patron and did not satisfactorily retain their extended position when mounted in place on top of the patron's automobile.

The present invention provides a unique structural arrangement of parts to form a rain visor for use on top of an automobile. The rain visor embodied herein includes a support, on the underside of which suction cups are mounted that are adapted to be located in vacuum-tight engagement on the top of the automobile. A plurality of arms radiate from the support and have a waterproof flexible material secured thereto that when located in the extended position thereof effectively overhang the windshield of the automobile for protecting the windshield from rain. The arms are held in position on the support by an overlying plate, and the inner ends of the arms project through the support into the upper end of one of the suction cups so as to prevent the movement of the suction cup relative to the support. In order to effectively retain the arms in either a folded or retracted position or in an open or expanded position, spring means are provided that are secured to the outermost of the arms and to an extension of the support.

Accordingly, it is an object of the present invention to provide a rain visor for an automobile that can be quickly and effectively applied to the top of the automobile for protecting the windshield thereof from rain.

Another object of the invention is to provide a rain visor for automobiles that includes suction cups that cooperate to effectively mount the rain visor on the top of the automobile, the suction cups including vacuum breaking handles that enable the user of the visor to quickly detach the unit from the top of the automobile.

Still another object is to provide an automobile rain visor which includes a plurality of radiating arms to which a flexible waterproof material is secured, the arms being retained in the extended or folded position thereof by spring members.

Other objects, features and advantages of the invention will become apparent as the description thereof proceeds when considered in connection with the accompanying illustrative drawings.

In the drawings which illustrate the best mode presently contemplated or carrying out the instant invention:

FIG. 4 is a top plan view of the rain visor showing it in the open or extended position thereof;

FIG. 5 is a sectional view taken along lines 5—5 in FIG. 4;

FIG. 6 is a sectional view taken along lines 6—6 in FIG. 5;

FIG. 7 is a sectional view taken along lines 7—7 in FIG. 4;

FIG. 8 is a perspective view of a portion of one of the rain visor arms showing a cleat secured thereto and to which a spring member is adapted to be connected; and FIG. 9 is a perspective view with portions broken away and shown in section of one of the radiating arms to which the flexible waterproof material is secured.

Figure 1:
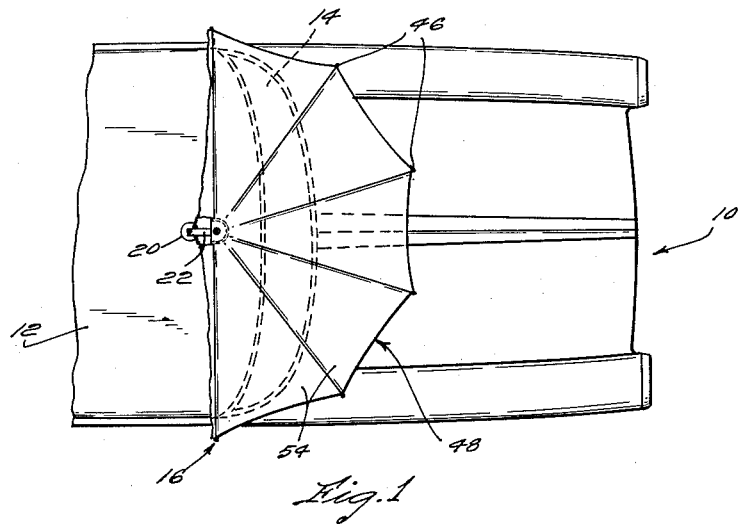
FIG. 1 is a top plan view of the front portion of an automobile showing the rain visor embodied in the present invention mounted on the top thereof.
Figure 2:
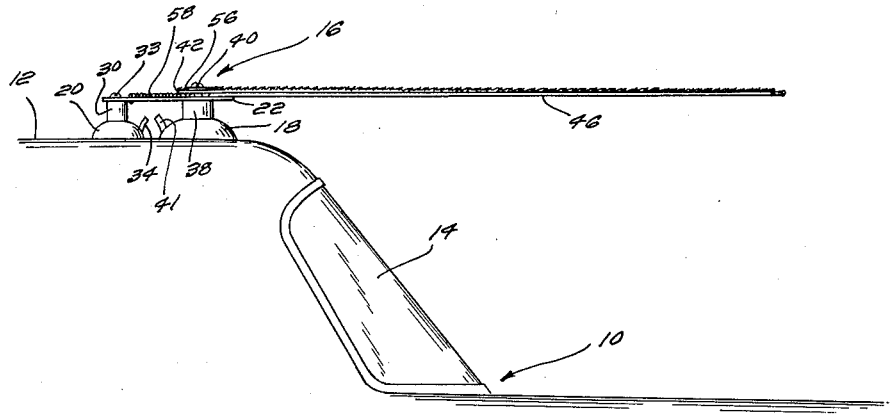
FIG. 2 is a fragmentary side elevational view of the automobile showing the mounted position of the rain visor with respect to the windshield thereof.

Referring now to the drawings and particularly FIGS. 1 and 2, an automobile generally indicated at 10 is illustrated and includes a top 12 and a windshield 14 that are formed in the conventional manner. Since the invention contemplates the shielding of the windshield 14, the rain visor embodied herein is mounted on the top 12 adjacent the windshield 14. As shown in FIGS. 1 and 2, the rain visor is generally indicated at 16 and includes suction cups 18 and 20 that are adapted to be attached to the top 12 for securing the rain visor 16 in position. As will be described hereinafter, a flexible sheet of waterproof material is formed as part of the visor 16 and extends substantially the entire width of the automobile and overhangs the windshield 14 to form a protective covering therefor.

Referring now to FIGS. 3 through 9, the rain visor 16 embodied herein is shown in detail and includes a support 22 that is formed with a forward or main portion 24 having an arcuate edge 26 and a rearwardly extending portion 28 that is formed integral with the main portion 24 and projects rearwardly with respect thereto. Secured to the outermost end of the rearwardly extending portion 28 is the suction cup 20 that includes an upwardly extending neck portion 30 that has a threaded nut 32 secured therein. A bolt 33 extends through the extension 28 and engages the nut 32 in threaded relation for securing the suction cup 20 to the support 22. Formed on the outer surface of the lower or suction portion of the suction cup 20 is a handle 34 that may be grasped by the user of the rain visor for lifting an edge of the suction cup to provide a quick release therefor when the unit is mounted on the top 12 of the automobile.

Secured to the underside of the main portion 24 of the support 22 is the suction cup 18 that is also provided with an interior nut 36 that is located within a neck section 38 of the suction cup 18. A bolt 40 projects through an upper plate 42 of the main portion 24 of the support 22 and threadably engages the nut 36 located in the neck section 38 of the suction cup 18. Also formed on the outer edge of the suction cup 18 is a handle 41 that is adapted to be moved by the user of the device to lift the lip of the suction cup thereby breaking the vacuum therein when the visor is dismounted from the top 12 of the automobile.

As shown particularly in FIG. 4, a plate 42 is provided and has a configuration that is somewhat similar to that of the main portion 24 of the support 22. The plate includes an arcuate edge 44 that is spaced inwardly with respect to the arcuate edge 26 of the main portion 24 and, as shown, the plate 42 is essentially provided for retaining a plurality of arms 46 in position and for this purpose overlies the arms 46 as illustrated in FIG. 5.

The arms 46 are formed as part of a rain shield or cover generally indicated at 48, each of the arms 46 including an inwardly turned inner end 50 shown particularly in FIG. 7. The inwardly turned end 50 projects through the main portion 24 of the support 22 and is received within the neck section 38 of the cup 18. The arms 46 are thus pivotally mounted with respect to the support 22 and are retained in position by the retaining plate 42 that is disposed in overlying relation with respect to the inner portions thereof. A locating pin 52 may be inserted through the plate 42 and the support 22 in order to positively locate these members with respect to each other and to prevent the relative rotation therebetween.

As shown particularly in FIG. 4 of the drawings, the arms 46 are located in radiating relation with respect to the support 22 and are equally spaced thereon so as to define a fan-shaped configuration when located in the fully extended position thereof. In order to provide the covering or shield for the windshield 14, the cover 48 includes a plurality of separately formed pie-shaped sections 54 of resilient water proof material. The sections 54 are secured to the arms 46 in conventional manner and may be sewn in place thereon as is known in umbrella constructions. The portions of the sections 54 that are located adjacent the outermost ends of the arms 46 are tied thereto as is also conventional in umbrella constructions. It is seen that when the arms 46 are moved outwardly to the expanded or open position thereof, the sections 54 expand therewith and form a canopy that is disposed over the windshield 14 in protective relation with respect thereto. The hub of the sections that define the flexible waterproof material is also secured to the retaining plate 42 and is held in position thereon by a grommet 56 through which the bolt 40 extends.

In the position of use, the shield cover 48 is disposed in a fan-shaped pattern with the endmost of the arms 46 located in substantially end-to-end relation. In this position, the endmost arms 46 are disposed such that the longitudinal axis thereof is located substantially perpendicular with respect to the longitudinal axis of the automobile. This relationship is shown particularly in FIGS. 1 and 4 of the drawings. In the open position the shield 48 extends substantially over the windshield 14 and provides a protective covering therefor that would prevent rain from striking the windshield when the automobile is parked in a drive-in theater or the like. The occupants of the automobile would then be able to view a movie screen through the windshield without having vision through the windshield obscured by rain.

It will be noted that the innermost ends of the arms 46 other than the endmost or outer arms project through the support 22 and into the neck section 38 of the cup 18. The cup 18 is thus firmly locked in position and is prevented from moving with respect to the support 22 when the interior arms 46 are pivotally moved from an open to a closed position or vice versa. Although the arms 46 may be moved to an open or closed position and will remain in the open and closed position without the assistance of externally applied devices, it has been found that use of spring members such as indicated at 58 provide a tensioning device for the sections 54 in the open position and further act to positively close the sections 54 to the folded position thereof. As shown in FIG. 4, each of the spring members 58 is connected to the extension 28 by one end thereof that extends through a suitable opening in the extension 28 and is connected to an adjacent outer arm 46. In order to properly retain the spring member 58 in engaging relation with the adjacent arm 46, an adaptor 60 shown in FIG. 8 is secured to the endmost or outer arms. The adaptor 60 is in effect wrapped around the channel configuration of the arms 46 and includes a tab 62 through which an opening 64 is formed. The end of the spring members 58 extend through the opening 64 and thereby lock the spring members 58 to the outermost or endmost arms 46. It is understood that the configuration of the arms 46 is formed in a channel-like construction as illustrated in FIG. 8 although the arms 46 may be formed in other configurations as desired. In this event, the adaptor 60 would be formed to conform to the cross sectional configuration of the outer arms 46.

Figure 3:
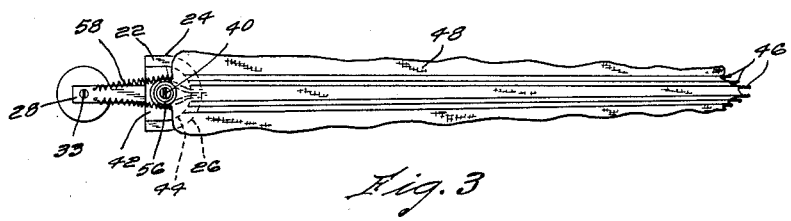
FIG. 3 is a top plan view of the rain visor as it is located in the closed or folded position thereof.

With the spring members 58 located in position as illustrated in FIG. 4 of the drawings, the arms 46 will be snapped to an open or closed position as desired. Thus, when the outermost arms 46 are moved toward or away from each other, the spring members 58 will move past an overcenter position to either cause the arms to snap to a folded or closed position as illustrated in FIG. 3 or to an open or extended position as illustrated in FIG. 4.

In use, the rain visor is simply mounted in position on the roof 12 of the automobile 10 by placing the suction cups 18 and 20 on the upper surface of the top or roof 12. When pressure is exerted downwardly on the suction cups 18 and 20, they will be forced into vacuum-tight engagement with the top 12. The shield or cover 48 may then be opened to the fully open or extended position by pulling outwardly on the endmost or outer arms 46. The springs 58 will act to pull the shield 48 to the fully open position as illustrated in FIG. 4. When it is desired to remove the visor from the mounted position thereof, it is only necessary to exert sufficient pressure on the handles 34 and 41 to raise the adjacent lips of the suction cups 20 and 18. The vacuum is then broken within the suction cups, and the entire visor assembly may be lifted from the top of the automobile. The outermost arms 46 are then pivoted inwardly, carrying the remaining arms therewith to the folded or retracted position as illustrated in FIG. 3. When the spring members 58 reach an overcenter position, they will snap the arms to a fully closed position and will act to effectively retain the rain visor in the folded position.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a rain visor assembly for an automobile windshield, a support plate having a front portion and an elongated rearwardly extending portion joined to said front portion, a first suction cup for engaging the top of said automobile secured to said support plate and including an upper neck section that abuts the underside of said support plate, a second suction cup for engaging the top of said automobile secured to the underside of the outer end of said rearwardly extending portion and spaced from said first suction cup, a plurality of spaced radially extending arms having downwardly turned portions formed on the innermost ends thereof that extend through openings formed in said support plate for pivotally mounting said arms on said support plate so that said arms are movable from a folded to a spread position, at least some of said downwardly turned portions extending through openings formed in the neck section of said first suction cup for preventing pivotal movement of said first suction cup with respect to said support plate, a securing plate overlying said arms and secured to said support plate in spaced relation for engaging said arms in said support plate and locking them in their pivotal position between said support and securing plates, a flexible sheet of waterproof material to which said arms are secured in spaced radial relation and being expandible into taut relation by said arms when said arms are pivoted to the spread position thereof, and means for normally retaining said arms in either a contracted or extended position wherein said flexible sheet is either folded to a position of non-use or fully expanded to provide a protective shield for the automobile windshield when the visor assembly is mounted on the automobile top.

2. In a rain visor for an automobile windshield, a support, a first suction cup for engaging the top of said automobile and secured to said support, a second suction cup secured to said support and spaced from said first suction cup, a plurality of arms pivotally secured to and radiating from said support said arms being pivotally movable from a contracted to an extended position, at least some of said arms having portions that project into said first suction cup, wherein said arms are pivotal with respect to said support and said first suction cup is fixed in position with respect to said support, a sheet of flexible waterproof material secured to said arms and responsive to movement of said arms to their outwardly pivoted position to form a continuously extending shield, a securing plate fixed to the upper surface of said support and engaging said arms to lock said arms in their pivotal position in said support, and means fixed to said arms and to said support for retaining said arms in either the contracted or extended position, wherein said flexible sheet is either located in a folded position of non-use or in an expanded position to provide a shield for the automobile windshield when the visor is mounted on the top of said automobile.

3. In a rain visor for an automobile windshield, a support, a suction cup for engaging the top of said automobile and secured to said support on the underside thereof, a plurality of arms pivotally secured to and radiating from said support and being pivotally mounted for movement from a contracted to an extended position, at least some of said arms including ends that project through said support and into said suction cup, a sheet of flexible waterproof material secured to said arms and forming a continuously extending shield when said arms are moved to the extended pivoted position thereof, a securing plate fixed to the outer surface of said support and engaging said arms to lock said arms in their position in said support, and means fixed to at least a pair of said arms and to said support for retaining said arms in either the contracted or extended position, wherein said flexible sheet is either located in a folded position of non-use or in an expanded position to provide a shield for the automobile windshield when the visor is mounted on the top of said automobile.

4. In a rain visor for an automobile as set forth in claim 3, said retaining means including a pair of springs, one end of said springs being secured to the outermost of said arms and the other end of said springs being secured to a rear extension of said support.

5. In a rain visor for an automobile windshield, a support, a suction cup for engaging the top of said automobile and secured to said support, a plurality of arms pivotally secured to and radiating from said support and including ends that project through said support and into said suction cup, wherein said arms are pivotally mounted with respect to said support and said suction cup is prevented from moving relative to said arms and support, a sheet of flexible material secured to said arms and forming a continuously extending shield when said arms are moved to the outwardly pivoted position thereof, and a securing plate fixed to the outer surface of said support and engaging said arms to lock said arms in said support.

6. In a rain visor as set forth in claim 5, a handle formed on said suction cup and projecting outwardly therefrom, said handle being engageable to lift the cup portion of said suction cup to break the vacuum therein when said suction cup is located in vacuum-tight engagement with the top of said automobile.

7. In a rain visor for an automobile windshield, a support, a first suction cup for engaging the top of said automobile and secured to said support, said support having a rearwardly projecting extension to which a second suction cup is secured for engaging the top of said automobile, a plurality of arms secured to and radiating from said support and being pivotally mounted for movement on said support from a contracted to an extended position, at least some of said arms including ends that project through said support and into the upper end of said first suction cup, wherein said suction cup is prevented from movement relative to said arms and support, a sheet of flexible waterproof material secured to said arms and forming a continuously extending shield when said arms are pivotally moved to the extended position thereof, and a securing plate fixed to the outer surface of said support and engaging said arms to lock said arms in said support, said suction cups including outwardly extending handles that are engageable for breaking the vacuum in said cups when said suction cups are located in vacuum-tight engagement with the top of said automobile.

8. In a rain shield as set forth in claim 7, spring means secured to the outermost pair of said arms and to said extension for retaining said arms in either a contracted or extended position, wherein said flexible sheet is either located in a folded position of non-use or in an expanded position.

References Cited in the file of this patent

UNITED STATES PATENTS

| | | |
|---|---|---|
| 820,261 | Russell | May 8, 1906 |
| 1,697,866 | Hansen | Jan. 8, 1929 |
| 2,302,300 | Davies | Nov. 17, 1942 |
| 2,736,375 | Rupert | Feb. 28, 1956 |
| 2,897,002 | Yovich | July 28, 1959 |
| 2,967,624 | Spellman | Jan. 10, 1961 |